United States Patent [19]

James

[11] 3,983,683
[45] Oct. 5, 1976

[54] OBLIQUE REEL MATERIALS HANDLING DEVICE

[76] Inventor: William E. James, 226 S. Dillwyn Road, Newark, Del. 19711

[22] Filed: Oct. 16, 1974

[21] Appl. No.: 515,337

Related U.S. Application Data

[63] Continuation-in-part of Ser. No. 322,891, Jan. 11, 1973, abandoned, which is a continuation-in-part of Ser. No. 99,580, Dec. 18, 1970, Pat. No. 3,751,888.

[52] U.S. Cl. .............................................. 56/364
[51] Int. Cl.² ................................................ A01D 89/00
[58] Field of Search ............ 56/364, 226, 227, 220, 56/366, 377, 400, 14.4

[56] References Cited
UNITED STATES PATENTS
| | | | |
|---|---|---|---|
| 2,595,788 | 5/1952 | Hill | 56/364 X |
| 2,829,485 | 4/1958 | Hofer | 56/364 |
| 3,472,008 | 10/1969 | Hurlburt | 56/226 |

FOREIGN PATENTS OR APPLICATIONS
| | | | |
|---|---|---|---|
| 694,155 | 9/1964 | Canada | 56/364 |

*Primary Examiner*—J.N. Eskovitz
*Attorney, Agent, or Firm*—Griffin, Branigan and Butler

[57] ABSTRACT

A crop harvesting machine is disclosed wherein tines of a transversely extending oblique reel pickup device pick up crop material from the ground and feed it into the crop harvesting machine. The oblique reel causes the tines to have velocity components parallel to the reel axis which are substantially greater than their velocity components parallel to the harvesting machine's forward motion as they feed the pre-severed crop material transversely into the crop harvesting machine. The tines are spaced relatively far apart yet provide efficient interception and clean-up of crop material from the ground.

A second embodiment of a transversely-extending oblique reel pickup device is disclosed wherein tines pick up pre-severed crop material backwardly and below the reel.

A U-joint type linkage member is disclosed herein to couple tine bars to spiders along with cam and followers in oblique reel pickup devices.

A link-and-lever system is described for rotating the bars of oblique reel pickup devices.

13 Claims, 17 Drawing Figures

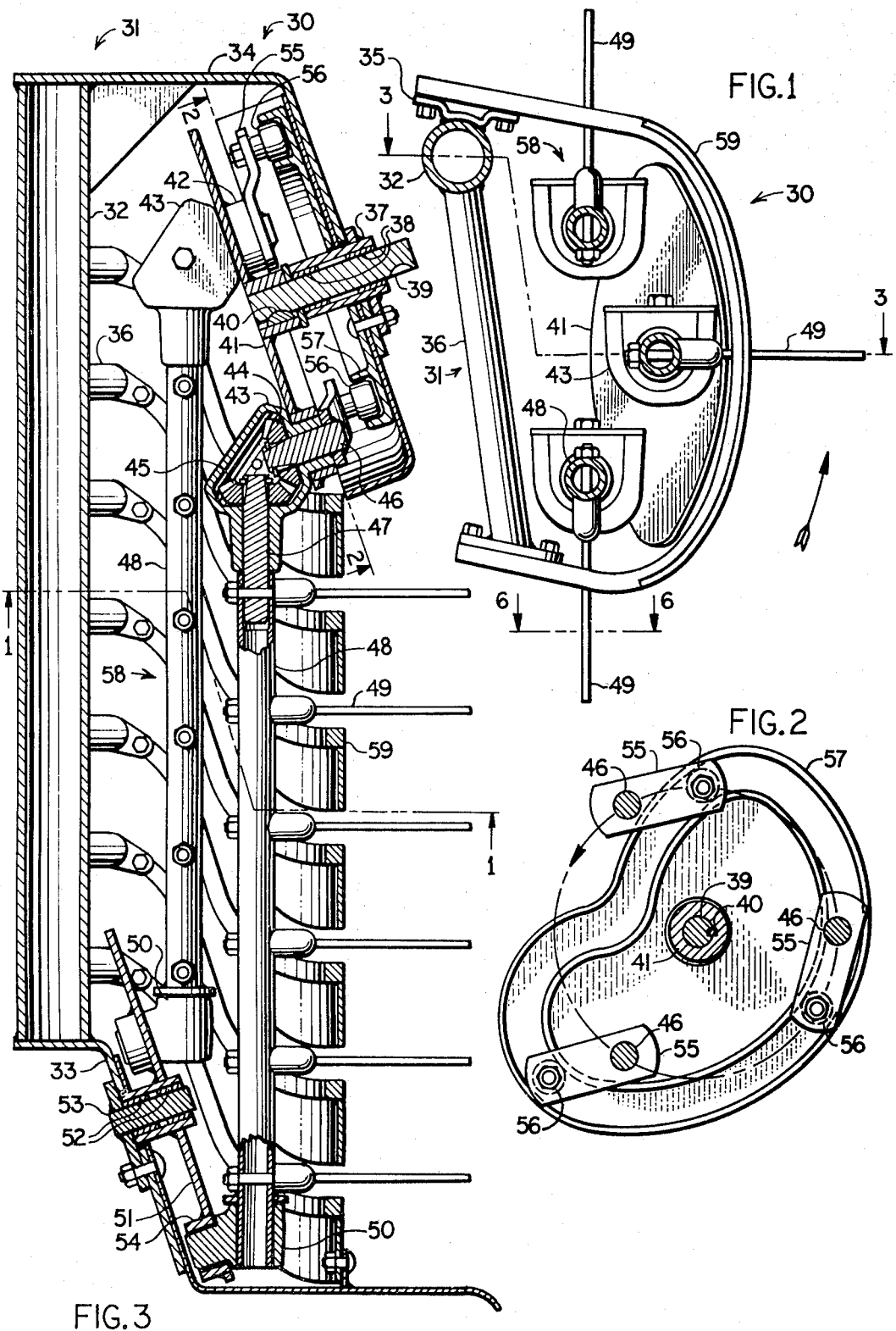

OBLIQUE REEL MATERIALS HANDLING DEVICE

BACKGROUND OF THE INVENTION

This is a continuation-in-part application of application Ser. No. 322,891, filed Jan. 11, 1973, now abandoned, which was, in turn, a continuation-in-part application of application Ser. No. 99,580, filed Dec. 18, 1970, now U.S. Pat. No. 3,751,888.

A wide variety of harvesting machines employ a cylindrical reel type pickup device in which tines are carried on parallel bars individually rotatable and controlled by cam and followers at one end of the reel. In a pickup on a hay baler, for example, the cam is shaped so that tines project radially outward between guards around the bottom, front and top of the reel to intercept and lift harvested material from the ground. Then, where material is transferred to other elements of the machine, each tine bar is rotated to give the tines an inclination such as to release the material and withdraw below the guards as they proceed around the back of the reel to return to the ground to intercept more material.

There are a number of limitations and difficult compromises inherent in this simple device, especially as herein described for the pickup application. It is commonly known that a relatively wide tine spacing (about four inches) causes significant losses of material in some conditions. Decreasing the spacing (to about 2½ inches) reduces losses, but the number of rocks and the like picked up often increases to the point that related problems such as knife breakage in the machine, and tooth breakage in cattle, as well as consequent loss of production, overshadow gains in harvested yield.

It has been recognized that a transverse motion of the tines can increase a pickup's efficiency of intercepting crop material on the ground (U.S. Pat. No. 2,829,485). And, in fact, transverse tine motion has been incorporated for this purpose in several oblique-reel-type "parallel-bar" hay rakes and in at least one pickup device (Canadian Pat. No. 694,155 to Friesen). However, Friesen's reel does not take advantage of transverse motion during feeding to improve its feeding efficiency. Thus, it is an object of this invention to provide a reel-type pickup device which feeds transversely in a manner to obtain increased feeding efficiency.

Regarding the development of oblique reels, prior-art oblique reels have been somewhat large in diameter, making them more suitable for rakes than pickup reels. In this regard, the tines of rakes do not normally rotate 360°; thus, spacing between tine bars must be greater than the lengths of the tines so that the tines can pass between the tine bars. This means that rake reels are normally somewhat large in diameter. In pickups however, in order to minimize the disruption of crop material while it is lifted over reels, the reels must be made as low as possible. Usually pickup-reel diameters are less than half the size of rake-reel diameters. Prior-art oblique reels have, therefore, normally been considered to be more suitable for rakes than for pickup application.

Secondly, prior art pickup-reel tines are typically relatively flexible and closely spaced so that as crop material is swept cleanly from the ground rocks and the like cause the tines to flex and pass between them. Usually, such tines must pass through spaces, or slots, between guards which support the crop material when it is conveyed by the tines. If prior-art tine spacing were used with oblique reels it would be virtually impossible to move the tines at any appreciable transverse angle and still have space for necessary guards and guard slots. In this regard, if prior-art flexible tines were used with an oblique pickup reel they would bend an undue amount in a transverse direction, because they would drive crop material with a transverse motion; thus, the guard slots would have to be rather large to accommodate the bending tines. Further, prior-art flexible tines would be too flexible to efficiently drive crop material transversely. Therefore, pickup tines have not appeared to be appropriate for use with oblique reels.

Thirdly, it has normally appeared to be unduly complicated and costly to adapt oblique reels for use in pickup devices. For example, to construct such devices it is necessary to coordinate transverse tine motion with rather complex guard slot shapes.

Therefore, it is an object of this invention to provide an oblique-reel machine which is well suited to act as a pickup device; which is not unduly complicated in structure; and which actually provides greater overall simplicity in crop harvesting machines of the pickup type.

The reels of most prior-art pickup machines rotate in such directions that crop engaging means move in the directions of travel of the pickup machines while intercepting pre-severed crop materials on the ground. As the reels continue to rotate the crop engaging means lift the pre-severed crop materials in front of the reels and deliver them backwardly, to conveyers, at the tops of the reels. In this manner fewer rocks and other objects are fed onto the conveyor as would be the case if the crop engaging means rotated in an opposite direction to sweep the pre-severed crop material immediately backwardly from the ground onto conveyors. Also, this arrangement normally insures a cleaner sweeping up of the pre-severed crop materials regardless of the volume of the windrow or the nature of the crop since the tines are not required to penetrate through the entire windrow. These comments do not concern mowing-machine "header reels" such as are described in U.S. Pat. No. 3,338,036 to Hurlburt because in such machines' reels ordinarily sweep backwardly at the bottom while mowing and feeding; however, the problem of rock pick-up in mowing machines, where the mower separates the crop materials from the ground, is a function of the mower rather than the reel. The mower type "header" reel merely conveys crop material which has already been separated from the ground.

A pickup machine could pick up pre-severed crop material at a faster rate if it swept the crop material immediately backwardly. Thus, it is another object of this invention to provide a crop pickup machine having a reel which rotates in such a direction as to sweep pre-severed crop material immediately backwardly from the ground onto conveyors but which does not pick up an undue amount of rocks and which provides a relatively clean sweeping up of crop materials.

It is another object of this invention to provide an "oblique reel" device as described in the preceding objects wherein tine bar rotation, and thus tine attitude, is controlled by cam and follower means to allow broad flexibility in employing this device in a wide variety of applications.

It is another object of this invention to provide an "oblique reel" device as described wherein tine bar rotation, and thus tine attitude, is controlled by means other than cam and follower means.

These and other objects and advantages of this invention will become apparent in the following specification and drawings wherein:

FIGS. 1-3 depict a pickup base on the "oblique reel," FIG. 1 being a side elevation section (line 1—1 in FIG. 3), FIG. 2 showing the cam and followers as viewed from section line 2—2 in FIG. 2, and FIG. 3 being a sectional plan view taken along line 3—3 in FIG. 1.

Figure 4:
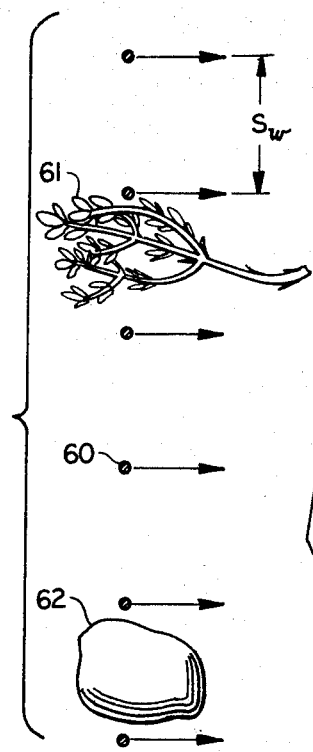
FIGS. 4-6 are sectional plan views of the tines of a representative conventional pickup with wide spaced tines, a conventional pickup with narrow spaced tines, and the "oblique reel" pickup of FIGS. 1-3 (line 6—6 in FIG. 3) respectively demonstrating comparative tine action.

In detailed reference to the drawings, in FIGS. 1-3 a pickup generally indicated by numeral 30, illustrating one particular embodiment of the present invention, is shown in such configuration as to readily replace a conventional pickup on a typical harvesting machine such as a hay baler, for example. The frame, generally indicated by numeral 31, like that of a typical conventional pickup, is a weld assembly consisting of a tubular cross member 32, a right arm 33 (bottom of FIG. 3), a left arm 34, seven upper guard supports 35 (FIG. 1), and seven lower guard supports 36. A left bearing hub 37 with bushings 38 is affixed to left arm 34, rotationally supporting drive shaft 39 which can be driven at its free projecting end in any conventional manner. On the inside of left arm 34 (below it in FIG. 3), drive shaft 39 is keyed to, as its right end, with key 40, and supports for rotation therewith, left spider 41 having three bearings 42 spaced equidistantly around its perphery having axes parallel to drive shaft 39. Each bearing 42 has journaled in it a hub portion of a gearbox 43 containing bevel gears 44 and 45 splined respectively to an input shaft 46 and an output shaft 47. Each input shaft 46 projects from its gearbox 43 through the hub portion of gearbox 43 journaled in bearing 42 so that its projecting end extends beyond the left side (upper right in FIG. 3) of left spider 41, while each gearbox 43 is supported for rotation on the opposite side. Each output shaft 47 exits its gearbox 43 at an angle (70° supplementary angle shown) to its corresponding input shaft 46 and is telescoped at its projecting end into one end of a tubular tine bar 48 aligned therewith. Three such tine bars 48 extend parallel to each other, one from each gearbox 43, toward right arm 33, each pinned to its corresponding output shaft 47 for rotation therewith by mounting one of six tines 49 affixed evenly spaced along each tine bar 48 so that its mounting bolt extension passes through both output shaft 47 and tine bar 48. At their opposite ends, at the right side of the pickup 30 (bottom of FIG. 3), each tine bar 48 is journaled in an end support 50, each end support 50 having a stub shaft portion extending toward right arm 33 at an angle (70° from its corresponding tine bar 48 and parallel to corresponding input shaft 46 and bearing 42 at the left side (top of FIG. 3). A right spider 41 is supported for rotation about an axis parallel to the stub shaft portions of end supports 50 on bushings 52 contained therein and pivoted on shaft and support plate 53 affixed to right arm 33 for this purpose. Right spider 51, like left spider 41, has three bearings 54 spaced equidistantly around its periphery having axes parallel to the axis of rotation of right spider 51 and to the axes of the stub shaft portions of end supports 50 which are journaled therein. As left spider 41 is rotated by shaft 39, then, right spider 51 is caused to rotate in timed relation with it, the tine bars 48 linking them, and orbiting bodily therewith in generally the same way as in the "parallel bar" rake.

Figure 11:
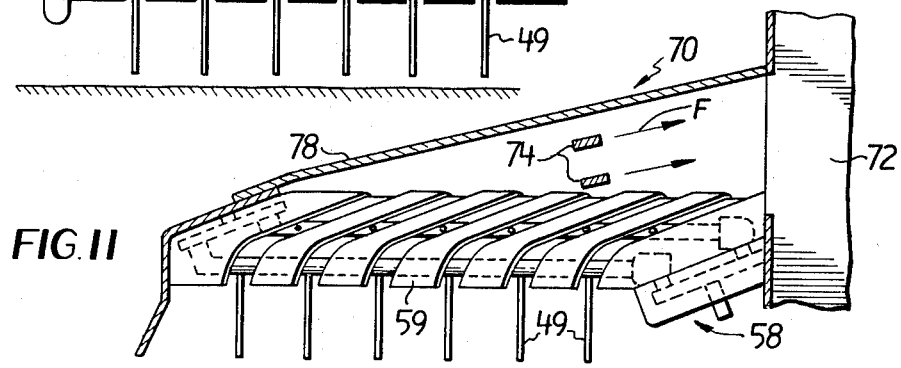
FIG. 11 is a top view of portions of a pickup machine employing principles of this invention, including a reel portion and a conveying portion.
Figure 12:
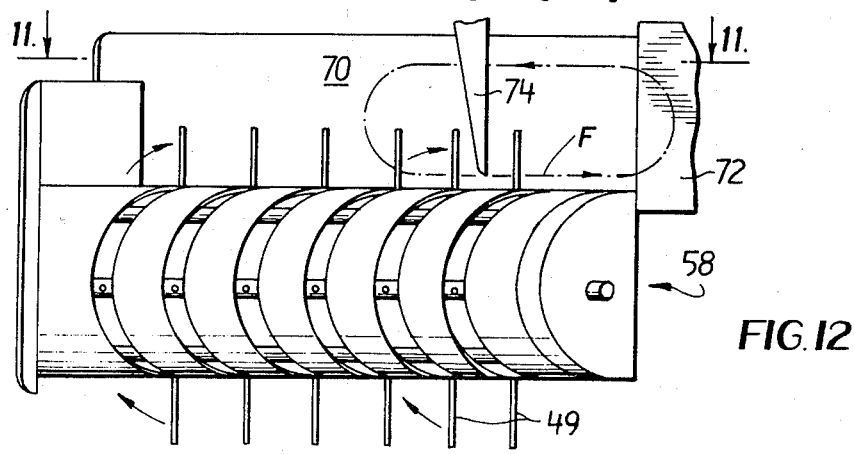
FIG. 12 is a frontal elevation view of the machine of FIG. 11.

But, here the mechanism and resulting tine action of the "oblique reel" of this invention departs significantly from the "parallel bar" reel. It is evident in FIG. 3 that the tine bars 48 are rotatable, each on its own axis as alreadly described. In each gearbox 43, bevel gears 44 and 45, having one-to-one ratio, cause output shaft 47 and tine bars 48 to rotate in unison with input shaft 46. At its projecting end at the left side of left spider 41, each input shaft 46 has affixed (shown welded) to it a follower lever 55, to the other end of which a follower roller 56 is affixed, its axis parallel to input shaft 46. Affixed to left arm 34 a face type cam 57 is situated parallel to left spider 41, its groove encircling drive shaft 39 and restricting movement of follower rollers 56 between the two flanges forming the groove therein. Thus, as the reel, generally indicated by numeral 58, revolves, follower levers 55 are caused to rotate, and through means of input shafts 46, bevel gears 44 and 45, and output shafts 47, the tine bars 48 with affixed tines 49 rotate, each in unison with its corresponding follower lever 55 and follower rollers 56, the tine bars 48 and tines 49 completing one revolution for each full turn of the reel 58. The cam 57 is shaped substantially as in a conventional pickup as as shown in FIG. 2 so that the tines 49 project generally radially outward at the bottom and front and top of the pickup (FIG. 1) through spaces between guards 59 partly surrounding the reel 58 and affixed to guard supports 35 and 36. An inward curve of the groove in cam 57 at its upper rear quadrant (upper left in FIG. 2) causes the tines 49 to maintain a generally vertical attitude substantially perpendicular to a crop-material feed direction F as depicted in FIGS. 11 and 12 and described in greater detail below, while withdrawing through the guards at the top in FIG. 1, while an outward convolution in the cam 57 in its lower rear quadrant rapidly rotates the tines 49 faster than the reel 58 so that they again point generally downward when they reach the bottom of the reel 58 as in a conventional cylindrical pickup.

Thus, the "oblique reel" of this invention combines the transverse tine motion of the "parallel bar" reel with the controlled tine bar rotation of the cylindrical reel, the tines 49 sweeping obliquely to one side near the ground in this pickup application to intercept material, projecting radially outward to lift material at the front, then moving obliquely toward the opposite side at the top of the reel 58 to deliver the material into the harvesting machine. The guards 59 are more complex in shape than those of a conventional pickup as seen in FIG. 3, the top halves (not shown in FIG. 3) having generally the same form as the bottom portions shown.

Figure 5:
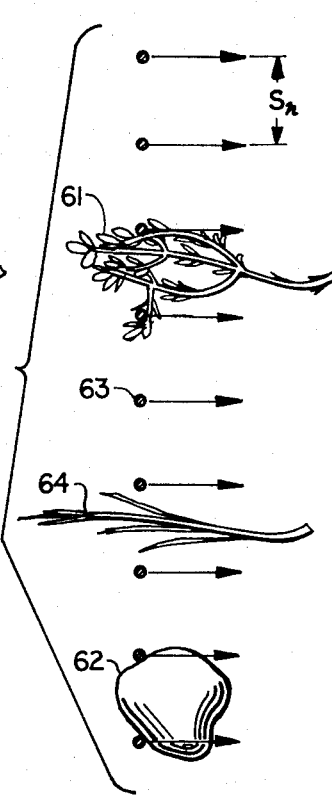
Figure 6:
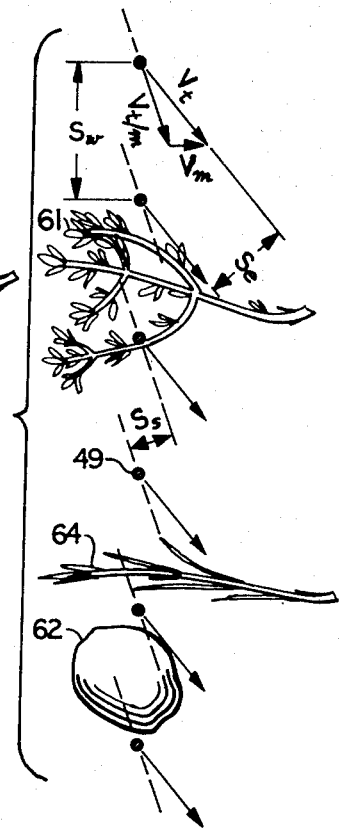

In FIGS. 4–6 the tine action of the "oblique reel" pickup is compared with that of conventional pickups as the tines sweep along the ground to intercept material. FIG. 4 is a sectional plan view of the tines 60 of a cylindrical pickup having a wide tine spacing $S_w$, the arrows indicating the tines' paths as they travel over the ground. A representative stem of hay 61 is shown aligned generally parallel to these paths of travel, the orientation in which stems are most likely to be missed by the tines 60. A representative rock 62 is shown passing between the tines 60, also, an advantage of course, and the main reason, after cost, that most pickups have a relatively wide tine spacing. FIG. 5 is a sectional plan view of the tines 63 of cylindrical pickup having a narrow tine spacing $S_n$. The same stem of hay 61 in this case is intercepted as shown, but the rock 62 is also caught and is much more likely to be picked up and fed into the machine. Still, a more slender stem 64 goes between the tines 63 when aligned parallel to tine travel as shown, and it is common too find most of the stems of hay lying generally parallel to tine travel of the conventional pickup. FIG. 6 is a sectional plan view of the tines 49 of the pickup of FIGS. 1–3 (line 6—6 in FIG. 1) having the same wide tine spacing $S_w$ as the cylindrical pickup of FIG. 4. Arrow $V_{t/m}$ indicates the tine velocity relative to the machine, that is, the tine path with the machine stationary. The machine's forward velocity $V_m$ adds vectorially to the oblique tine velocity $V_{t/m}$ as shown, resulting in the actual tine velocity over the ground $V_t$. Thus, the effective spacing of the tines 49 is $S_e$, which is much narrower than the actual spacing $S_w$. As shown, stem 61 is intercepted by the tines 49 sweeping transversely to it. Even the slender stem 64 is more likely to be intercepted, and, even if it were lying parallel to the oblique tine motion indicated by the arrows extending downward to the right in FIG. 6, it still would be as likely to be picked up as with the cylindrical pickup with narrow spaced tines 63 of FIG. 5.

To even further increase the "oblique reel" pickup's interception efficiency the forward velocity of the machine $V_m$ can be reduced to give a more oblique resultant tine motion, further narrowing effective tine spacing $S_e$, effective tine spacing approaching a minimum value $S_s$, the effective spacing with the machine stationary. The oblique broken lines in FIG. 6 represent the tine paths with the machine stationary. The wide actual spacing $S_w$ of the tines 49, however, allows the rock 62 to pass between them as easily as between the equally wide spaced tines 60 of the cylindrical pickup of FIG. 4. Also, while the tines of a cylindrical pickup will roll a large stone or the like forward, the tines striking it several times, finally to pick it up, the "oblique reel" pickup will tend to roll such foreign objects to the side, reducing the chances of picking them up even if such objects will not pass between the tines.

It presently appears that a tine spacing of as much as 5 inches is as effective on an oblique reel as a 2½ inch spacing on a conventional reel, although this has not been confirmed by tests. Thus, it appears that tine spacing can be approximately twice as large for oblique pickup reels as for conventional pickup reels.

The wide range of tine spacings found in prior art reel type pickups presently available (approximately 2½ to 4 inches) is indicative of the need for a device requiring much less of a compromise in designing for efficiency of crop material interception and foreign object rejection.

Figure 7:
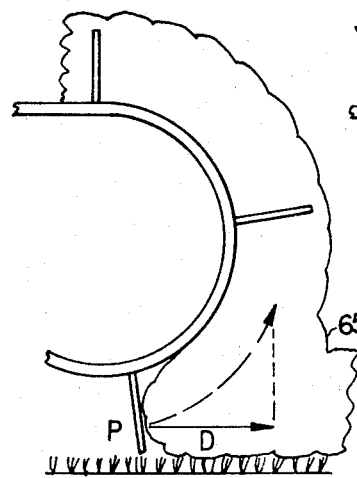
FIGS. 7 and 8 are diagrammatic side elevation views of a conventional pickup and an "oblique reel" pickup respectively showing relative action upon material as it is intercepted and picked up.
Figure 8:
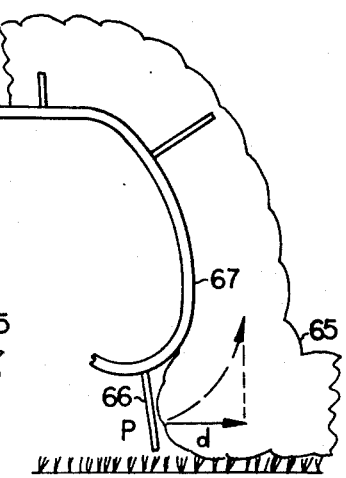

FIGS. 7 and 8 are diagrammatic side elevation views of a cylindrical pickup and an "oblique reel" pickup respectively. The smaller forward displacement $d$ of the material 65 from the point of interception P by the tines 66 of the "oblique reel" pickup of FIG. 8 as they lift material 65 compared to the much larger displacement D of the conventional pickup of FIG. 7 is another advantage. Inclining the "oblique reel" pickup about a generally transverse axis as shown further augments this advantage, reducing the projection of the guards ahead of the interception point P. Longitudinally compressing intertwined stems of material such as hay in a windrow has been shown to cause the stems to be much more easily detached from the mass, as fibers from a rope, contributing to loss of material. Also, longitudinal movement between stems within the windrows can cause branches and leaves to be broken from the stems, a major source of loss in legume crops where the leaves contain a high percentage of the total nutrient value. The tines of the "oblique reel" pickup as in FIG. 8, moving at a considerable angle to the windrow with the majority of the stems in it lying generally parallel to the windrow, push the windrow more laterally than longitudinally, tending to hold the mass of stems together rather than telescoping them loosely into each other.

Another significant characteristic of an "oblique reel" pickup machine employing principles of this invention is its oblique tine motion at the top of the reel 58. This characteristic can be understood by comparing the operation of a prior-art, non-oblique-reel pickup machine, depicted in FIGS. 9 and 10, with an oblique-reel pickup machine employing principles of this invention, depicted in FIGS. 11 and 12.

Using the same numerals to designate similar elements of the prior-art pickup machine and the pickup machine of this invention, the prior-art pickup machine generally comprises a reel 58, a conveying mechanism 70 and a processing portion 72.

The reel 58 has tines 49 which intercept crop material on the ground, lift the crop materials forwardly in front of the reel 58 and deliver it straight backwardly to the conveying mechanism 70 at the top of the reel 58. During this operation the tines 49 respectively rotate in single planes parallel to a forward direction. Most of the crop material is delivered straight backwardly by the tines 49 to laterally conveying forks 74 and 75. The purpose of the laterally conveying forks 74 and 75 is to collect crop material from the entire width of the reel 58 and convey the material in a relatively narrow stream to the processing portion 72.

The processing portion 72 could be one of various types of devices. For example, it could be a hay baler as depicted, a peanut combine or simply a storage container. In most instances such devices are designed such that crop material must be received in a narrow stream.

Turning now to FIG. 11 the tines 49 of an oblique-reel harvesting machine operating according to principles of this invention also intercept crop material on the ground, lift the crop material forwardly in front of the reel 58 and deliver it backwardly to the conveying mechanism 70 at the top of the reel 58. However, at the top of the reel 58, the tines are maintained substantially perpendicular to a crop-material feed direction F and are moving at an angle of approximately 70° to the forward direction of travel. This means that crop material being fed over the top of the guards 59 to the conveying mechanism 70 is continuously in a most efficient manner, carried laterally toward the processing portion 72 while still in the control of the pickup tines 49. A wall 78 prevents crop material from being thrown beyond the reach of the conveying or feeding fork 74.

In operation, as the tines 49 feed and release crop material to the conveying mechanism 70 they hurl the crop material laterally, thereby concentrating the crop materials into a narrow stream on the pickup reel 58 itself. Thus, crop material is picked up in a relatively wide swath and is conveyed to the processing device 72 in a narrow stream, smoothly making the transition as the material is fed into the machine by the pickup tines 49.

The angular motion of the tines, with respect to forward direction, should be substantially greater than 45° for it to meaningfully contribute to a pickup's feeding efficiency by producing a narrow stream. In this regard, best results can be obtained when this angle exceeds 60°. As mentioned above, in the preferred embodiment this angle is 70°.

Figure 9:
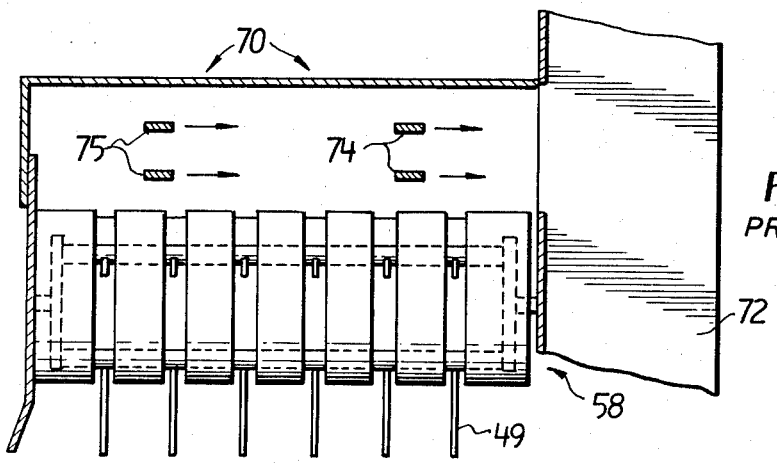
FIG. 9 is a top view of portions of a prior-art pickup machine, including a reel portion and a conveying portion.
Figure 10:
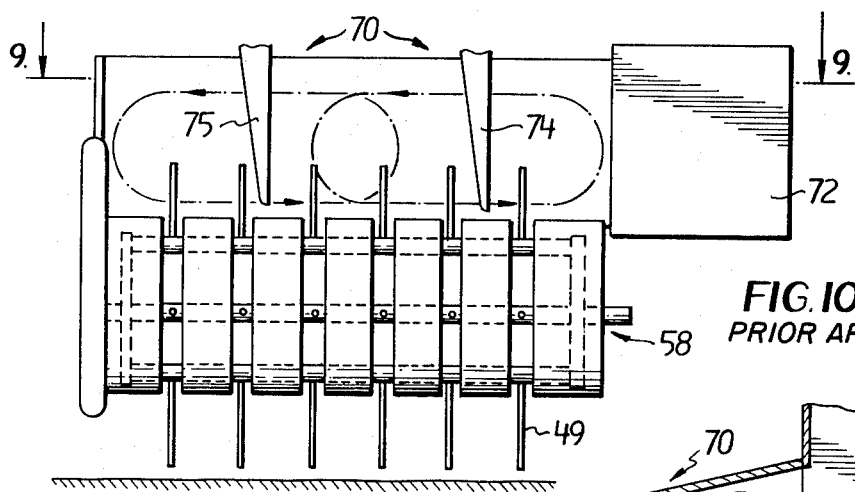
FIG. 10 is a frontal elevation view of the machine of FIG. 9.

This lateral feed feature allows important design economics in the machine of FIGS. 11 and 12 by reducing or eliminating the need for lateral conveyors, such as the laterally conveying forks 74 and 75 of the prior art machine of FIGS. 9 and 10. An increased complexity of the pickup is offset by the simplification made possible in the lateral conveying mechanism so that an improved pickup type machine can be made at a competitive cost. In the machine of FIGS. 11 and 12, the forks 75 of FIGS. 9 and 10 and any attendant driving mechanism and support means, guards, etc., have been eliminated.

In addition, as was explained in relation to FIGS. 4–6, the oblique reel pickup devices of FIGS. 11 and 12 can sweep crop material from the ground efficiently with a much wider tine spacing. Further, the tines can be less flexible than most prior art tines, since rocks and the like can more easily pass between them, or even pass to the side of the reel. This wide tine spacing allows a very pronounced inclination for most effective conveying while still leaving space for guards. The less flexible tines are more efficient as transverse conveyors since they do not bend an undue amount as they drive crop material transversely. The wider spacing of tines results in the use of fewer tines and guards, and therefore represents a savings in the number of parts.

Further, the highly oblique motion of the oblique reel allows a reduction in the number of tine bars in a reel. Normally, four to six bars are required so that a sufficient number of sweeps per unit time can be attained without an excess final tine tip velocity against the crop material at a point of interception. Since an "oblique reel" has an intercept velocity component which is highly inclined from the forward travel velocity the resultant final tine tip intercept velocity is much lower for any given speed of rotation. Thus, a faster turning three bar "oblique reel" is the equivalent of a conventional five bar pickup reel. The faster turning "oblique reel" would be capable of picking up at a higher forward velocity with no increase in disruption of crop material.

Above all, a pickup of an "oblique reel" type makes a very effective transverse conveying device which eliminates or reduces the need for further conveying mechanism in a pickup type harvesting machine, and an overall simpler and less costly machine can result that has improved handling characteristics owing to a reduced number of handling stages within the machine and to a smoother transition in direction of flow of material being conveyed.

Figure 13:
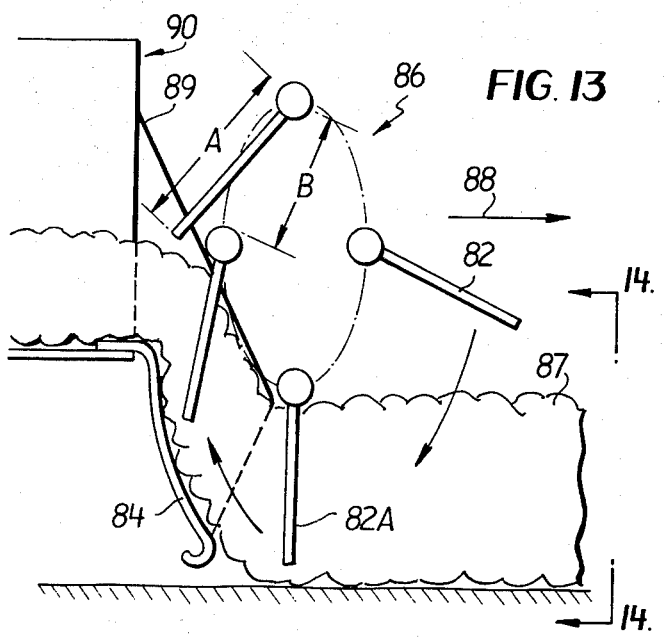
FIG. 13 is a side elevation of portions of another embodiment of a pickup machine employing principles of this invention.
Figure 14:
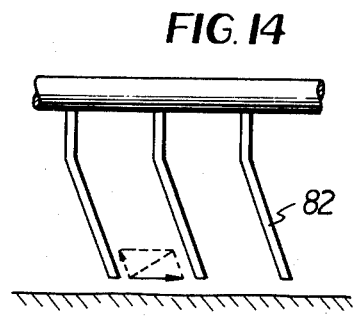
FIG. 14 is a frontal elevation view of a tine bar and several tines of the pickup of FIG. 13.

Referring now to FIGS. 13 and 14 there is shown an embodiment of this invention wherein pre-severed crop material 87 is picked up backwardly by the tines 82 and lifted immediately up a baffle 84 extending the width of a reel 86. In this embodiment the reel 86 is similar to the reel 58 in the embodiment of FIGS. 11 and 12, however, it is turning in an opposite direction. The tines 82 are moving at an angle of 70° to a forward direction 88 of a pickup machine when they are at the bottom of the reel 86, as are, for example, tines 82A. It follows that the tines 82 feed the crop material 80 laterally, as well as backwardly, thus allowing reduction of conveyors as described above in relation to the FIGS. 11–12 embodiments.

Such a backwardly conveying pickup machine would not pick up an undue amount of rocks or other similar debris because the tines 82 are spaced relatively far apart as was described above in relation to FIGS. 4–6. The tines 82 could be inclined laterally to the forward direction of travel as shown in FIG. 14 to provide an increased lifting tendency as the tines 82 penetrate into a windrow of crop material 87 and move transversely to it. A baffle 84 contains and holds the crop material 87 against the tines 82 as they move the material upward and transversely to the direction of travel 88. An end wall 89 prevents material from being pushed beyond the end of the baffle 84 and causes the tines 82 to exert a greater lifting force on the material at the end of the reel 86, the material being held against the tines 82 by the wall 89. Thus, the crop material is conveyed transversely to forward travel 88 while being picked up and fed in a narrow stream into a processing machine 90.

An important advantage of the "oblique reel" as shown in FIG. 13 is that it allows a relatively long tine length A to penetrate windrows with a relatively small reel diameter, and with a bar spacing B less than tine length A. This is important also in the embodiment of FIGS. 1–3, as it allows the reel diameter to be relatively small so that disruption of the windrow of crop material is held to a minimum as it is lifted over the reel.

FIG. 12 depicts a "Universal" or U-joint 100 which replaces gearboxes 43 of FIGS. 1–3 at each tine bar 48. In this manner, a simplified version of the pickup of FIGS. 1–3 is constructed using a similar cam and follower drive as in FIGS. 1–3.

Figures 15, 16:
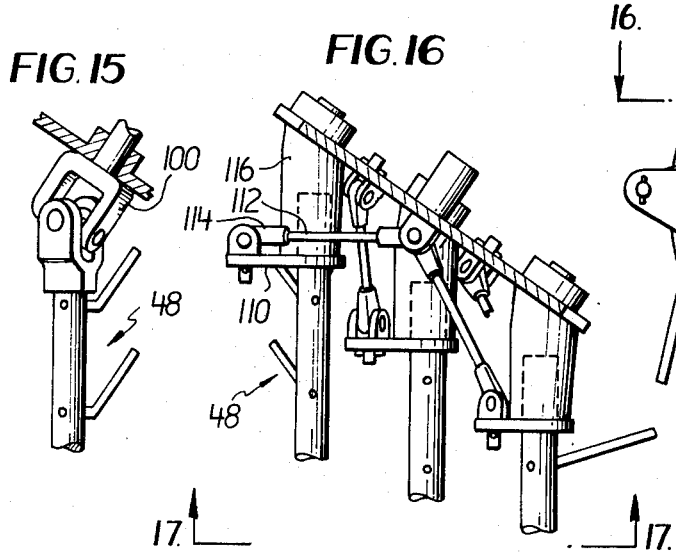
FIG. 15 is a top view of a universal joint as it would replace one of the gearboxes 43 of the pickup of FIGS. 1-3 in a lower cost version of the pickup; and, FIGS. 16 and 17 respectively are a partial sectional plan view and a sectional elevation view of a reel with tine bars rotated by link and lever means.
Figure 17:
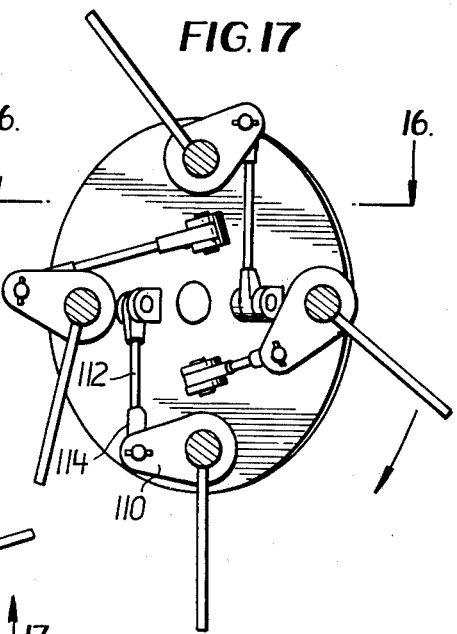

Turning to FIGS. 16 and 17, a still further simplified drive means for the tine bars 48 is shown. Here, levers 110 are affixed to the tine bars 48 near the ends of the tine bar 48, and are connected by links 112, having loose knuckle type ends 114, to the spider 41. The links 112, cause the levers 110 to rotate the bars 48 due to the inclination of the spider 41 with respect to the tine-bar axes. Attachment points of the links 112 to the spider 41 can be positioned to provide the tine orientation desired.

While the invention has been particularly shown and described with reference to preferred embodiments, it will be understood by those skilled in the art that various changes in form and detail may be made therein without departing from the spirit and scope of the invention.

The embodiments of the invention in which an exclusive property or privilege are claimed are defined as follows:

1. In combination, a crop harvesting machine of the type which is adapted for traveling in a forward direction and picking up pre-severed crop material from the ground, said crop harvesting machine comprising a transversely extending reel-type pickup device for picking up said pre-severed crop material and feeding it into said crop harvesting machine, said reel-type pickup device having a reel axis and comprising:
   parallel tine bars extending transversely to said forward direction;
   crop-engaging tines mounted on said tine bars and extending substantially perpendicularly away from said tine bars;
   a driving means for rotating said parallel tine bars both about a reel axis and about individual tine-bar axes to cause said crop-engaging tines to pick up said pre-severed crop material from the ground and to drive said pre-severed crop material in a feeding direction and to release said pre-severed crop material thereby feeding said pre-severed crop material into said crop harvesting machine;
   the improvement wherein said driving means drives said crop-engaging tines relative to the rest of said crop harvesting machine with velocity components parallel to said reel axis which are substantially greater than their velocity components parallel to said forward direction and rotates said parallel tine bars about said tine bar axes to retard rotation to the outer tips of said crop engaging tines about said reel axis to thereby maintain said tines substantially perpendicular to said feeding direction, while releasing said pre-severed crop material to feed said pre-severed crop material into said crop harvesting machine;
   wherein said tines feed said crop material substantially axially along said reel axis transversely to said forward direction in a path substantially narrower than the width of said reel-type pickup device.

2. In combination, a crop harvesting machine as claimed in claim 1 wherein said driving means drives said crop-engaging tines while feeding said pre-severed crop material into said crop harvesting machine in a direction which forms an angle greater than 60° with said forward direction.

3. In combination, a crop harvesting machine as claimed in claim 2 wherein said driving means drives said crop-engaging tines while feeding said pre-severed crop material into said crop harvesting machine in a direction which forms an angle of approximately 70° with said forward direction.

4. In combination, a crop harvesting machine as claimed in claim 1 wherein said driving means also drives said crop engaging tines with a motion having a velocity component parallel to said reel axis while picking up said pre-severed crop material from the ground.

5. In combination, a crop harvesting machine as claimed in claim 4 wherein said driving means comprises end members which are rotatable about substantially parallel offset axes, and to which respective ends of said tine bars are mounted for revolving about said offset axes.

6. In combination, a crop harvesting machine as claimed in claim 5 wherein said driving means further comprises tine-bar mounting means for mounting said tine bars on said end members and for allowing said tine bars to rotate individually about axes substantially parallel to said tine bars.

7. In combination, a crop harvesting machine as claimed in claim 6 wherein said driving means further comprises a cam-and-follower means for rotating said tine bars about individual tine-bar axes and connecting means for operatively connecting said tine bars to said cam-and-follower means.

8. In combination, a crop harvesting machine as claimed in claim 7 wherein said connecting means comprise gears.

9. In combination, a crop harvesting machine as claimed in claim 7 wherein said connecting means comprises universal coupling members.

10. In combination, a crop harvesting machine as claimed in claim 6 wherein said driving means further comprises linkage means operatively connecting said tine bars to said end members for rotating said tine bars about their axes in response to rotation of said end members.

11. In combination, a crop harvesting machine as claimed in claim 10 wherein said linkage means comprise levers respectively rigidly attached to said tine bars and links respectively pivotally attached between said levers and said end members.

12. In combination, a crop harvesting machine as claimed in claim 1 wherein said tines comprise portions which are inclined laterally to the forward direction, whereby said tines exert increased lifting force on pre-severed crop material which they intercept.

13. In combination, a crop harvesting machine of the type which is adapted for traveling in a forward direction and picking up pre-severed crop material from the ground, said crop harvesting machine comprising a transversely extending reel-type pickup device for picking up said pre-severed crop material and feeding it into said crop harvesting machine, said reel-type pickup device having a reel axis and comprising:
   parallel tine bars extending transversely to said forward direction;
   crop-engaging tines mounted on said tine bars and extending substantially perpendicularly away from said tine bars;
   a driving means for rotating said parallel tine bars both about a reel axis and about individual tine-bar axes to cause said crop-engaging tines to pick up said pre-severed crop material from the ground and to drive and release said pre-severed crop material, thereby feeding said pre-severed crop material into said crop harvesting machine, said driving means comprising end members which are rotatable about substantially parallel offset axes, and to which respective ends of said tine bars are mounted for revolving about said offset axes, and said driving means further comprising levers respectively rigidly attached to said tine bars and links respectively pivotally attached between said levers and said end members for rotating said tine bars about their axes in response to rotation of said end members;

said driving means driving said crop-engaging tines relative to the rest of said crop harvesting machine with velocity components parallel to said reel axis which are substantially greater than their velocity components parallel to said forward direction and rotating said parallel tine bars about said tine bar axes to retard rotation of the outer tips of said crop engaging tines about said reel axis while releasing said pre-severed crop material to feed said pre-severed crop material into said crop harvesting machine;

wherein said tines feed said crop material substantially axially along said reel axis transversely to said forward direction in a path substantially narrower than the width of said reel-type pickup device.

* * * * *